(12) United States Patent
Sasano et al.

(10) Patent No.: US 6,198,837 B1
(45) Date of Patent: *Mar. 6, 2001

(54) METHOD OF STORING MEDICAL IMAGE INFORMATION RECORDED IN SHEET SHAPED RECORDING MEDIUM

(75) Inventors: Yasuhiko Sasano; Yasushi Yamanaka; Yoshiyuki Ishimitsu, all of Hino (JP)

(73) Assignee: Konica Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,448

(22) Filed: Aug. 19, 1997

(30) Foreign Application Priority Data

Aug. 23, 1996 (JP) ................................................ 8-222290
Aug. 23, 1996 (JP) ................................................ 8-222291

(51) Int. Cl.[7] ........................................................ G06K 9/00
(52) U.S. Cl. ............................................ 382/132; 382/287
(58) Field of Search ........................... 382/132, 128, 382/287, 289, 291, 305; 348/705

(56) References Cited

U.S. PATENT DOCUMENTS

| | | | |
|---|---|---|---|
| 4,969,049 | * 11/1990 | Mitani et al. | 382/305 |
| 5,038,393 | * 8/1991 | Nanba | 382/287 |
| 5,075,785 | 12/1991 | Sugishima | 358/448 |
| 5,077,811 | 12/1991 | Onda | 382/46 |
| 5,133,020 | * 7/1992 | Giger et al. | 382/128 |
| 5,282,065 | 1/1994 | Rackman | 358/455 |
| 5,374,965 | * 12/1994 | Kanno | 348/705 |
| 5,533,143 | * 7/1996 | Takeo | 382/132 |
| 5,592,572 | * 1/1997 | Le | 382/289 |
| 5,644,649 | * 7/1997 | Schoeters et al. | 382/132 |
| 5,668,888 | * 9/1997 | Doi et al. | 382/132 |
| 5,892,840 | * 4/1999 | Jang et al. | 382/132 |

FOREIGN PATENT DOCUMENTS 0465011  1/1992 (EP).

OTHER PUBLICATIONS

European Search Report EP 97 11 4282.
European Patent Office—Patent Abstracts of Japan, Publication # 05127321, Publication Date Dec. 25, 1993.

* cited by examiner

*Primary Examiner*—Yon J. Couso
(74) *Attorney, Agent, or Firm*—Jordan B. Bierman; Bierman, Muserlian and Lucas

(57) ABSTRACT

Image information recorded on a sheet-shaped recording medium is read and converted into digital image data, wherein the image information includes medical image information and image information used for orientation discrimination and the image information for orientation discrimination is recorded at a predetermined position on the sheet-shaped recording medium. The position of the image information for orientation discrimination on the sheet-shaped arrangement of digital image data corresponding to the sheet-shaped recording medium is recognized. Then, the mounted orientation of the sheet-shaped recording medium is discriminated on the basis of the recognized position of the image information for orientation discrimination on the sheet-shaped data arrangement of digital image data.

22 Claims, 16 Drawing Sheets

1996 / 05 / 01

THE NAME OF PATIENT : TAROU KONISHI

THE DISTINCTION OF SEX : MALE

THE DATE OF BIRTH : 1930 / 01 / 01

ID                              : 1 2 3 4 5 6 7

METHOD OF STORING MEDICAL IMAGE INFORMATION RECORDED IN SHEET SHAPED RECORDING MEDIUM

BACKGROUND OF THE INVENTION

The present invention relates to an electronic storing system and a storing method for an image recorded in a sheet-shaped recording medium.

Conventionally, a technique to obtain image signals by reading an image recorded in a sheet-shaped recording medium and to reproduce the image by applying an appropriate image process to the image signals or a system to file the image signals in a mass storage recording medium such as an optical disk and to make it possible to search and reproduce the image has been suggested.

In the case that a X-ray film outputted from an automatic processing machine is directly inserted into a slot of a digitizer or set on a platen of a digitizer, an inserting direction of the X-ray film or a setting orientation of the X-ray film and an obverse or reverse surface of the X-ray film are set randomly on the digitizer. That is, a mounted orientation of the X-ray film on the digitizer is varied due to the inserting direction, the setting orientation and the obverse or reverse surface of the X-ray film. It is very important to rotate the orientation of digital image data or to turn inside out the sheet-shaped arrangement of the digital image data so as to rearrange the digital image data into an arrangement of digital image data read on the normally mounted orientation (or a normally mounted attitude) among operations to store X-ray image data. Accordingly, conventionally, in the digitizer having a slot, a X-ray film is visually checked by an operator and the inserted orientation of the X-ray film is regulated before inserting the X-ray film into the slot. Although the visual check by the operator is reliable, it is less efficient when a X-ray film outputted from an automatic processing machine is subsequently digitized. Since the visual check could not follow the throughput of the automatic processing machine, the number of films processed per unit time are reduced.

As stated above, in such a system, it is very important to detect precisely the inserted orientation of a sheet-shaped recording medium in which a X-ray image is recorded and to arrange the X-ray image in the normally inserted orientation.

As a technique to detect the inserted orientation of the X-ray film, various suggestions were made. For example, Japanese Patent Application Publication No. 5-127321 discloses a technique to detect the inserted orientation of a X-ray film used as a sheet-shaped recording medium from a notch provided in advance on the X-ray film. Further, on the basis of the detected inserted orientation, a position of ID section is detected or a process such as an image arrangement rotating process is applied to an image and the rotated image is outputted as digital image data. However, a machining process to provide a notch on the film is very troublesome. Furthermore, there is a problem to use a special detecting device such as an infrared sensor to detect the notch.

Incidentally, when a patient is photographed on a medical X-ray film at a hospital, generally, the name of a patient and the ID number are printed as a label on the film so that the label makes it possible to visually identify of which a patient the photographed image is. In this case, the label exists as a part of image information on the developed X-ray film.

Hitherto, in the case that image information recorded on a X-ray film is digitized and stored electronically, an operator confirms a film to be digitized and reads the label on the film in order to identify of which patient the digitized image data are. On the basis of the information, the operator reads patient information and photographing information through a terminal from another hospital information system (hereinafter, merely referred as HIS), inputs the patient information and the photographing information by a key board and stores the digital image data together with the patient information in an electronic medium.

However, with the above technique, since the operator has to directly visually confirm patient identification information recorded the X-ray film one by one and to input the ID number provided to the patient and the patient information and the photographing information, it takes a lot of time (several minutes per one sheet). The number of digital image data to be read and stored within a unit time are limited. Further, there is a risk that input error may takes place because the patient identification information, the patient information and the photographing information are manually inputted.

Furthermore, with the conventional technique, since the operator confirms ID number on the original X-ray film, the original X-ray film could not be distributed to a doctor expected to diagnose from the original X-ray film until the confirmation work had been completed after the original X-ray film has been digitized. As a result, since a lot of time has been elapsed before the doctor observes a picture of a diseased part, there is a serious problem that the diagnosis for the condition of the diseased part by the doctor may be delayed.

SUMMARY OF THE INVENTION

The first objective of the present invention is to provide an apparatus and a method by which an image is stored after the inserted orientation (or, referred to as the mounted attitude) of a sheet-shaped recording medium on the reading apparatus is precisely discriminated, whereby an image can be recorded with a simple construction without employing a machining process to provide notch on the sheet-shaped recording medium.

Further, the second objective of the present invention is to provide a storing system and a storing method for a medical image recorded on a sheet-shaped recording medium by which troubles caused by visual confirmation for each patient ID number and by an erroneous operation with manual input can be avoided, a storing operation for a medical image recorded in a sheet-shaped recording medium together with additional information such as patient information, photographing information and so on can be conducted efficiently rapidly, and a required medical image information can be delivered for a short time to the section requesting the medical image information.

As a result of diligent investigation, the present inventors have found that the above first objective can be attained by discriminating the inserted orientation of the sheet-shaped recording medium on a reading apparatus by recognizing a position of image information for inserted orientation discrimination on digital image data wherein the image information for inserted orientation discrimination is image information other than medical image information among the image information recorded on the sheet-shaped recording medium read by the reading apparatus and the position of the image information for inserted orientation discrimination recorded on the sheet-shaped recording medium is predetermined.

As a result of diligent investigation, the present inventors have found that the above second objective can be attained by storing patient relevant information corresponding to patient identification information and medical image information recorded in a sheet-shaped recording medium read by a reading means as patient synthetic information in a correlated form by a storing means in the case that the same patient identification information as the patient identification information read from the sheet-shaped recording medium resides in the registered patient identification information in the data base when the read patient identification information is compared with the registered patient identification information previously stored in data base.

DETAILED DESCRIPTION OF THE PREFERRED EMBODIMENT

In the present invention, as a sheet-shaped recording medium, a X-ray film or a stimulative phosphor sheet on which a X-ray image is recorded may be used. Further, a reading apparatus by which image data are read and converted into digital data, Film Digitizer LD-4500 (manufactured by Konica Corporation) is preferably used. Film Digitizer LD-4500 scans with a laser beam an image on a X-ray film so that analog images on the film are converted into digital signals. As a storing apparatus to store image data, any mass storage volume recording apparatus for a computer may be used.

Embodiment 1

Hereinafter, an embodiment with regard to an apparatus and a method to discriminate the inserted orientation of the sheet-shaped recording medium will be described.

In the present invention, as an apparatus to discriminate the inserted orientation, any type of universal computer may be used. For example, Sparc Station (manufactured by SUN Corporation) can be used.

The system in example of the present invention comprises an image reading apparatus to read an image and to output digital image signals; an image recording apparatus to store the digital image data outputted from the reading apparatus; and a work station to process the digital image signal. The image reading apparatus functions as reading means and converting means to convert to digital image data. The work station functions as means for recognizing a position of image information for inserted orientation discrimination, means for discriminating the inserted orientation of the sheet-shaped recording medium and means for correcting the digital image data. The image recording apparatus functions as storing means.

In the method of discriminating a inserted orientation of the sheet-shaped recording medium such as a X-ray film according to the present invention, when the X-ray film on which ID information indicating a patient ID number and so on are printed together with a X-ray image is digitized, plural regions are registered as candidate regions for ID section in which ID information is recorded. A dispersion value or standard deviation of image data in each candidate region is calculated. A candidate region having the highest dispersion value or the highest standard deviation is specified as the ID section. The inserted orientation of the X-ray film can be discriminated from the position of the ID section on the X-ray film.

Alternatively, derivative image data are produced for image data in candidate regions and a dispersion value or standard deviation is calculated for the derivative image data in each candidate region. A candidate region having the highest value is specified as the ID section. The inserted orientation of the X-ray film can be discriminated from the position of the ID section on the X-ray film.

Figure 1:
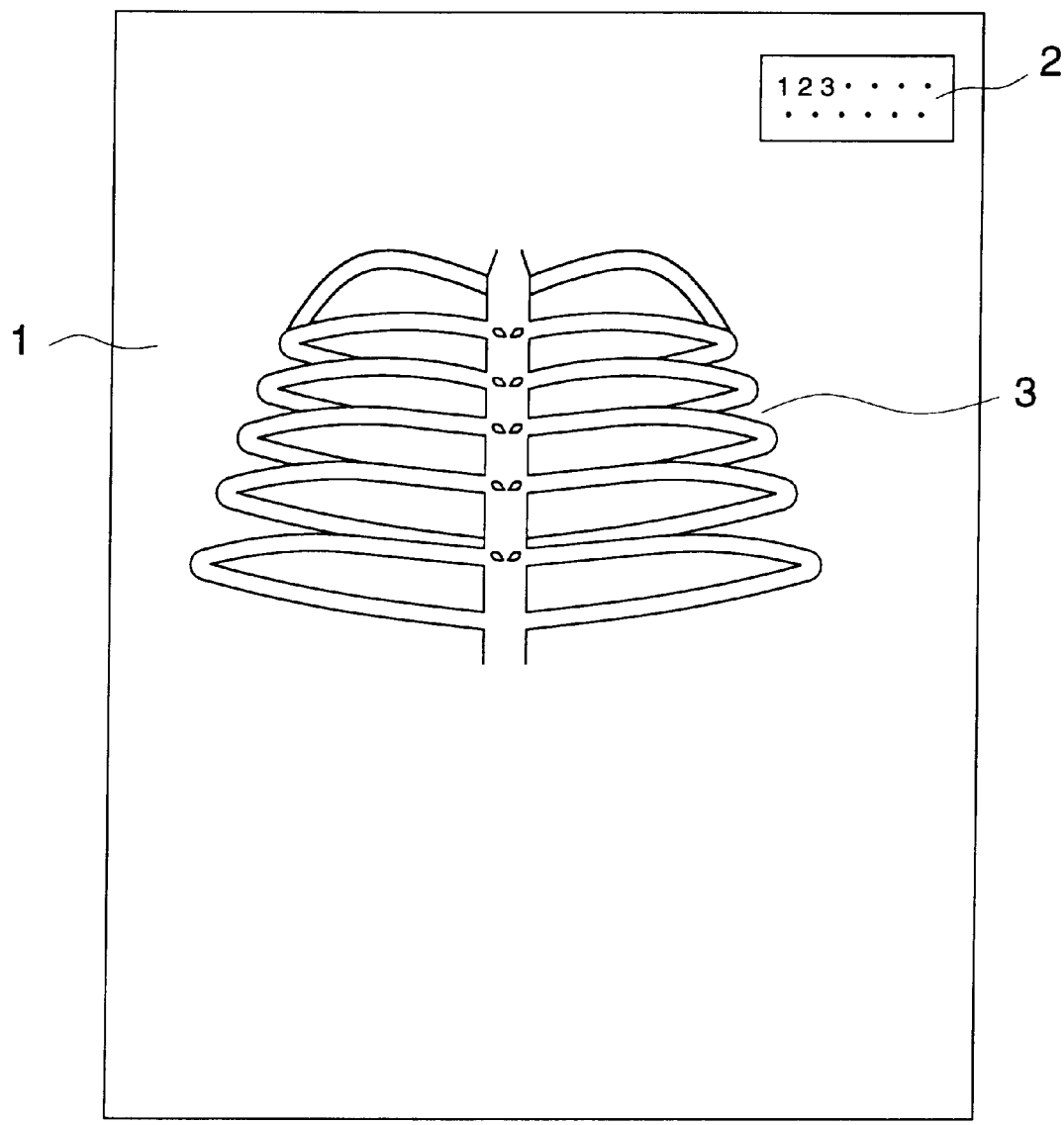
FIG. 1 is an illustration showing image data recorded in a sheet-shaped recording medium of the present invention.

More concretely, a X-ray film as an example of a sheet-shaped recording medium of the present invention is shown in FIG. 1. ID section 2 is printed by Konica KD name printer on a X-ray film 1 loaded in Konica KD-W cassette. The above cassette is brought in contact with a disease section of a patient and a X-ray image of the disease section is photographed on the X-ray film. The X-ray film is developed so that the X-ray image of the disease section is recorded on the X-ray film. By the use of Konica KD-W cassette and Konica KD name printer, ID section 2 comprising characters is set at an upper right section of the X-ray film as shown in FIG. 1. The inserted orientation or the mounted attitude of the X-ray film shown in FIG. 1 in which the characters are not the left-oriented characters or the reversed characters and are readable shows the normally inserted orientation of the X-ray image. Accordingly, Konica KD-W cassette and Konica KD name printer are combined in a system such that the normally inserted orientation can be recognized easily.

Figure 6:
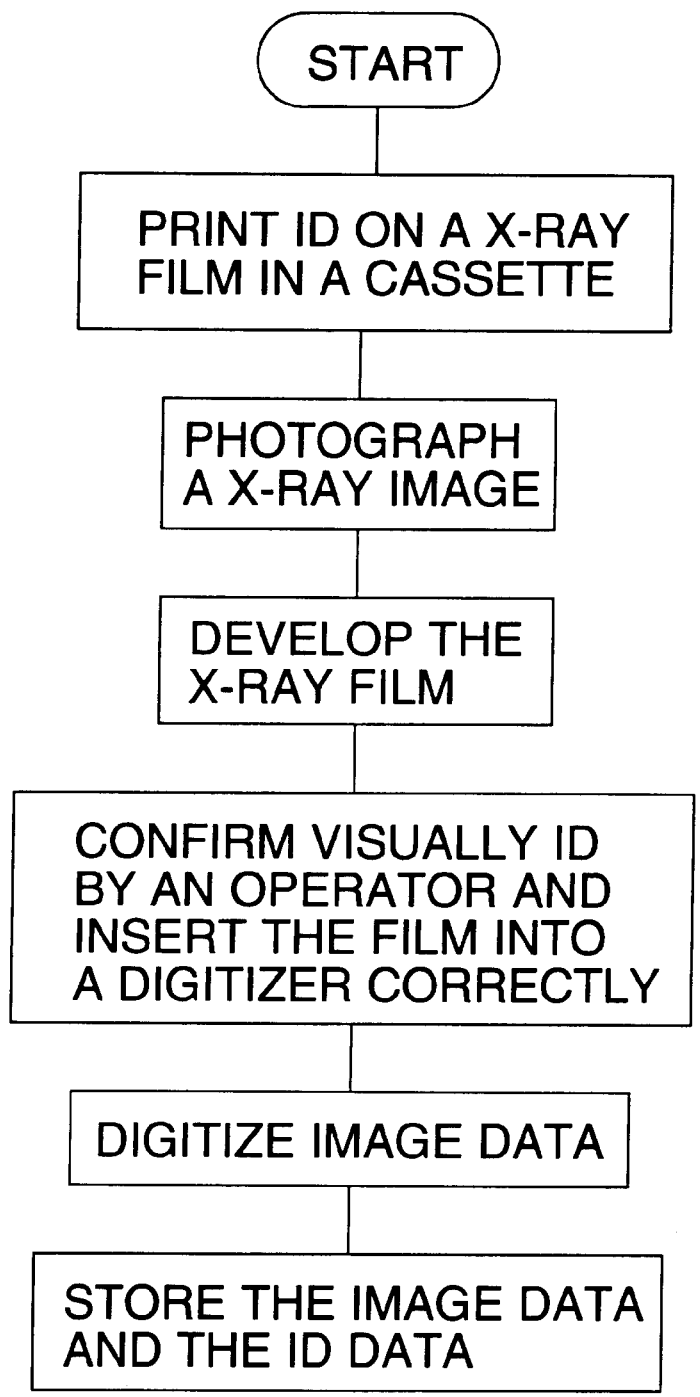
FIG. 6 is a flow chart showing a conventional method of discriminating a inserted direction.

Now, a conventional method is explained with reference to the flow chart shown in FIG. 6. ID information is printed on a X-ray film. A X-ray image of a patient is photographed on the X-ray film and then the X-ray film is developed.

An operator visually confirms the ID information on the X-ray film and inserts the X-ray film with the normally inserted orientation in a reading apparatus to convert digital data. The medical image information such as image data and ID information are converted into digital image data by the reading apparatus and stored in a storing apparatus.

Figure 7:
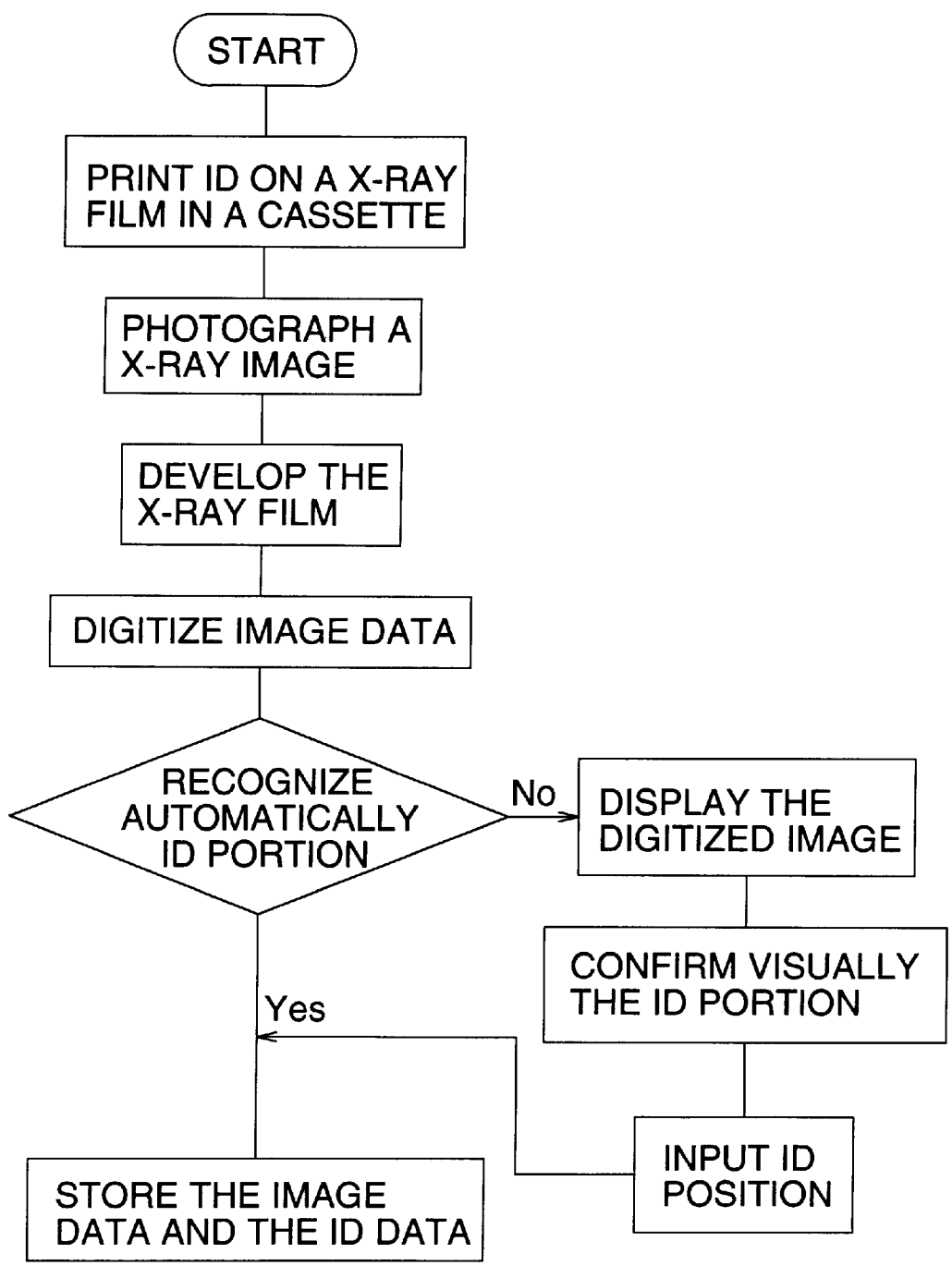
FIG. 7 is a flow chart showing a inventive method of discriminating a inserted direction.

On the other hand, in a method of the present invention shown in a flow chart in FIG. 7, the processes up to the film development are the same as that in the conventional method. However, the developed X-ray film is directly conveyed by a conveying device to a film digitizer, whereby the medical image information are converted into digital image data. ID section 2 is automatically recognized from the converted digital image data and the converted digital image data are stored in a form with the normal inserted orientation as mentioned later. If the ID section 2 could not be automatically recognized, the digital image data are indicated on a display and an operator visually confirms the ID section 2 on the display and inputs manually the position information of the ID section 2 so that the digital image data are stored in a form with the normal inserted orientation. In the above case (No. 1) that ID section could not be automatically recognized, further when the operator could not visually confirms the ID section 2 due to a poor image photographed on out of focus, the operator will take a suitable action.

Figure 2:
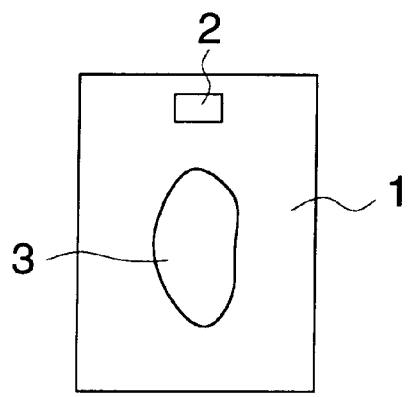
FIGS. 2(a) to 2(c) are views to explain a print position of ID information recorded in sheet-shaped recording mediums.
Figure 2:
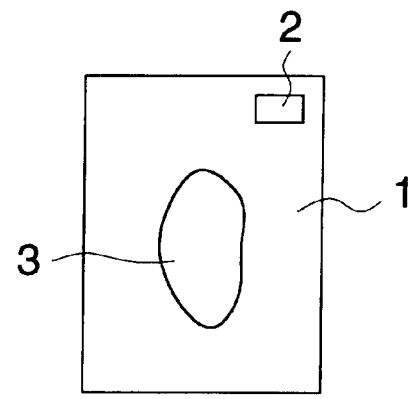
Figure 2:
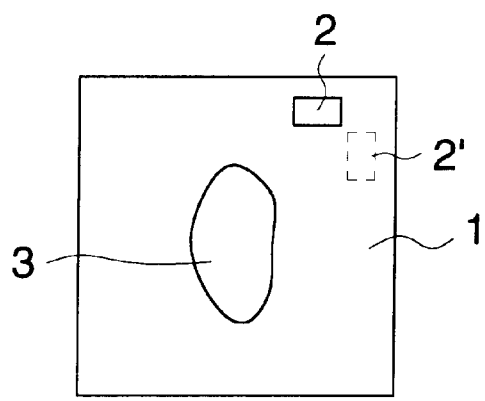

In the case that the X-ray film is a rectangle in a size of 14×17, 11×14 or 10×12 (inch), it may be preferable to avoid to print ID section 2 on the center of a side as shown in FIG. 2(a). Instead, it may be preferable to print ID section 2 at a corner on which a X-ray image is not photographed as shown in FIG. 2(b).

On the other hand, in the case that the X-ray film is a square in a size of 20×20 (inch), it may be preferable to print the ID information on a corner on which a X-ray image is not photographed and at a position that ID section 2' observed when the X-ray film is reversed and rotated by 90° is not superimposed at the same position of the original ID section 2 as shown in FIG. 2(c).

After the X-ray film on which the ID section 2 and the X-ray image 3 are recorded is developed, the X-ray film is randomly conveyed to a film digitizer (for example LD-4500 manufactured by Konica Corporation). Since there is provided a sensor to detect automatically sizes of length and width at the entrance of the film digitizer, whether the conveyed orientation of the X-ray film is the lengthwise orientation or the widthwise orientation is discriminated and the discriminated orientation data is inputted into a universal computer used as a inserted orientation discriminating apparatus.

Figure 3:
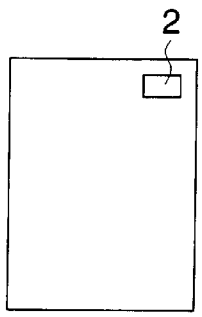
FIGS. 3(a) to 3(h) are views to explain a positional relationship of image data recorded in sheet-shaped recording mediums.
Figure 3:
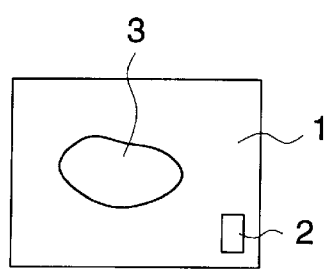
Figure 3:
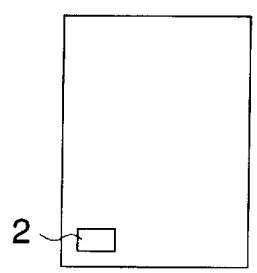
Figure 3:
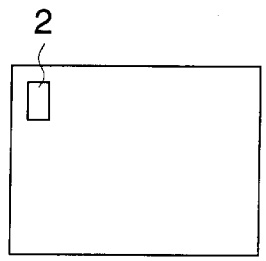
Figure 3:
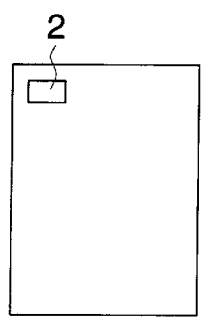
Figure 3:
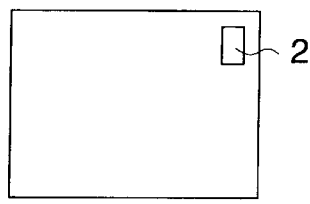
Figure 3:
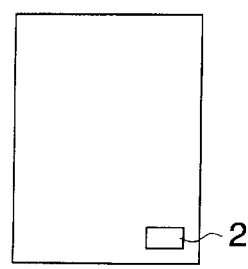
Figure 3:
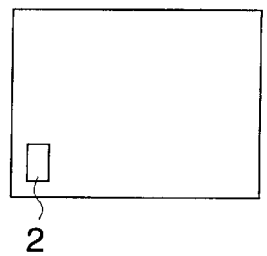

As the orientation of the X-ray film mounted on the film digitizer, eight kinds of orientations or eight kinds of mounted attitudes can be considered as shown in FIGS. 3(a) to 3(h) due to an inserting direction and an obverse or reverse surface. FIG. 3(a) shows the normally mounted orientation. FIG. 3(b) shows the mounted orientation when the X-ray film is rotated by 180°. FIGS. 3(c) and 3(d) show the mounted orientation when the X-ray film is reversed. FIGS. 3(e) to 3(h) show the mounted orientation when the X-ray film is conveyed in the widthwise orientation. In FIGS. 3(a) to 3(h), ID section is recorded at a position 2 respectively.

The conveyed X-ray film is scanned for each pixel from a(1,1) to a(m,n) by the film digitizer and digital image data are obtained for each pixel.

ID section 2 printed on the X-ray film is located at the corner on which X-ray image is not photographed. Accordingly, relatively uniform image data are obtained from a periphery around the ID section 2. In contrast, since ID information recorded in the ID section 2 consists of character information including edge image data, the dispersion value of image data of the ID information is different from that of the periphery. Then, such a characteristic is utilized in the present invention. That is, a dispersion value or standard deviation of image data in each candidate region at the position 2 in FIGS. 3(a) to 3(h) is calculated and the dispersion value or the standard deviation of each candidate region is compared with that of others. As a result of the comparison, the candidate region having the highest value is determined as the ID section 2. With the sensor to automatically detect the sizes of length and width, since whether the conveyed orientation is the lengthwise orientation or the widthwise orientation is judged in the case to a rectangle X-ray film, the candidate regions is classified into those shown in FIGS. 3(a) to 3(d) or those shown in FIGS. 3(e) to 3(h) Accordingly, the dispersion values or the standard deviations of four candidate regions are compared. In order to make a processing speed higher, a dispersion value or a standard deviation can be calculated from partial image data extracted from the candidate region. When the dispersion value or the standard deviation of the next candidate is larger than a half of the maximum value of the top candidate, derivative image data are produced for the top candidate and the next candidate. A candidate region having a larger dispersion value is determined as the ID section 2. From a position of the thus obtained ID section, the inserted orientation of the X-ray film can be discriminated as either one of FIGS. 3(a) to 3(h).

When the conveyed orientation data outputted from the sensor to automatically detect the sizes of length and width indicates that a square X-ray film is conveyed, the candidate regions are presumed as shown in FIGS. 5(a) to 5(h). As explained in FIG. 2(c), since ID section 2 is printed at a predetermined position such that the ID sections 2 in FIGS. 5(a) to 5(h) are not placed at the same position, the ID section 2 in FIG. 5(a) can be discriminated from the ID section 2 in FIG. 5(g). In the case of the square X-ray film, the dispersion values or the standard deviations of eight candidate regions are to be compared, and the ID section 2 is determined from the comparison results. Incidentally, the inserted orientation shown in FIGS. 5(a) to 5(h) correspond to the inserted orientation shown in FIGS. 3(a) to 3(h) respectively.

The average value A of each candidate region is calculated from the image data of each candidate region, and then the dispersion value δ or the standard deviation SD are obtained from the following formula.

Average Value $$Ave = \frac{1}{n}\sum_{i=1}^{n} a_j$$

Dispersion Value $$\sigma = \frac{1}{n}\sum_{i=1}^{n}\{a_j - Ave\}^2$$

Standard Deviation $SD = \sqrt{\sigma}$

When the inserted orientation is determined from the position of the ID section, digital image data of a(1,1) to a(m,n) obtained as the first data are stored in the form with the normally inserted orientation. For example, in the case of FIG. 3(a), the digital image data are stored in the order of a(1,1)➡a(2,1)➡ · · · ➡a(1,n)➡ · · · ➡a(m,n). In the case of FIG. 3(b), in the order of a(m,n)➡a(m−1,n)➡ · · · ➡a(1,n)➡ · · · ➡a(1,1). In the case of FIG. 3(c), in the order of a(m,1)➡the priority to −x direction➡a(1,n). In the case of FIG. 3(d), in the order of a(1,n)➡the priority to x direction➡a(m,1). In the case of FIG. 3(e), in the order of a(m,1)➡the priority to y direction➡a(1,n). In the case of FIG. 3(f), in the order of a(1,n)➡the priority to −y directions➡a(m,1). In the case of FIG. 3(g), in the order of a(m,n)➡the priority to −y direction➡a(1,1). In the case of FIG. 3(h), in the order of a(1,1)➡the priority to y direction➡a(m,n).

Since the digital image data stored in the above manner are stored in the form with the normally inserted orientation in any cases, when a doctor or a X-ray engineer reproduces the digital image data, an image are reproduced with the normally inserted orientation. As a result, when a X-ray film is inserted into the digitizer, it can be inserted without taking a care for the inserted orientation of the X-ray film. Further, the inserting method is usually determined on the condition that the reference line is placed on the left side. However, it become possible to place the reference line on the center line or on the right side. As a result, the inserting position is not a problem on the design of the digitizer. Additionally, it is possible to store only the image information at the normal position from the read region. Incidentally, information used for discriminating the inserted orientation or the inserted orientation is not limited to the image information forming character. Image information indicating bar code information is also used for discriminating the inserted orientation or the inserted orientation.

Embodiment 2

Next, an embodiment of a system and a method of storing a medical image information recorded in a sheet-shaped recording medium and patient identification information in a correlated form is explained.

When a X-ray image recorded in a X-ray image recording medium such as a X-ray image or a stimulative phosphor sheet is digitized by a digitizer such as a stimulative phosphor sheet reader and a film digitizer, digital image data can stored in an electronic non-volatile memorizing medium such as a hard disk, an optical disk and a magnetic disk and it becomes possible to provide the digital image data for diagnosis by indicating it on an electronic display device or a search system by the use of a computer. CRT display which is superior in a signal range for luminance of a medical image is mainly used for the display device. Besides the CRT display, a liquid crystal display or a plasma display may be used. Further, when the X-ray image is indicated, the digital image data are applied with a gradation conversion or a frequency processing by an image processing means prepared separately from the display device so that it is possible to enhance the performance of diagnosis.

Figure 8:
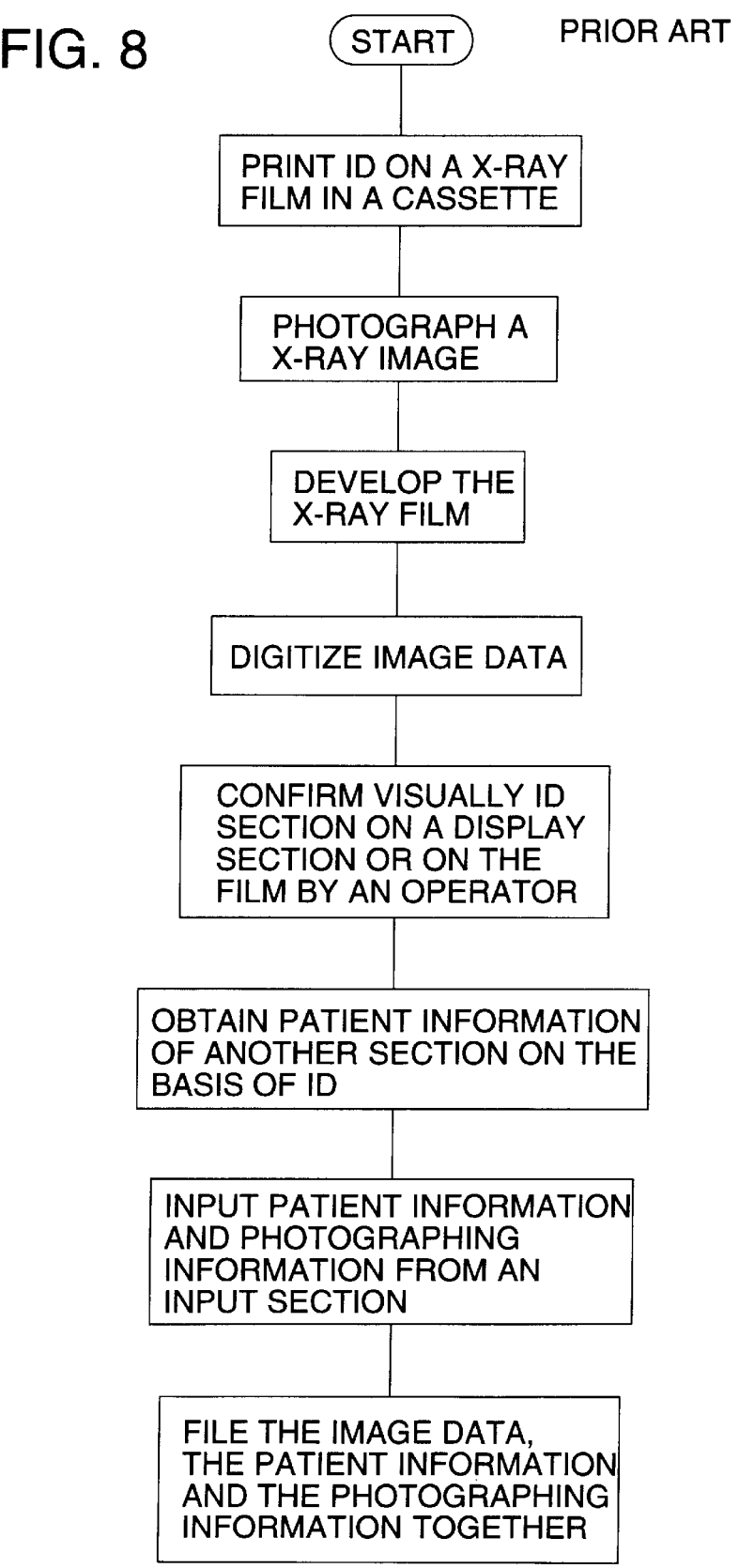
FIG. 8 is a flow chart showing a conventional system for reading X-ray image information.

A conventional method of storing the digitized X-ray image is indicated as a flowchart in FIG. 8. That is, patient identification information (hereinafter, merely referred as ID information) of a patient to be photographed is printed at a predetermined position on a X-ray film loaded in a cassette by a print device such as a name printer in order to identify of which patient the photographed image is. Next, a X-ray image of a diseased section of the patient is photographed on a X-ray film and the X-ray film is developed. The obtained image including ID information is digitized by the digitizer and is indicated on a display means. The ID information printed on a corner of the X-ray film can be indicated together with the X-ray image of the diseased section on the indicated image on the display means. An operator confirms visually the indicated ID information on the display means or directly the printed ID information on the developed X-ray film. Then, the operator obtains patient relevant information through on-line or by a document from a hospital information system (HIS) to administrate patient information or from a radiology department information system (RIS) administrate information of patients of the radiology department on the basis of the confirmed ID information. When the digital image data are stored, the patient information and photographing information indicating the photographing condition are stored together as the patient relevant information (or header information). As the patient information, the name of the patient, the distinction of sex and the date of birth may be considered. As the photographing information, for example, the photographing date, a photographed section, a photographing condition (voltage, mAs value), and an amount of X-ray may be considered. As information determined in detail, information officially listed in "Standard I, II common to the electronic storage" of the Welfare Ministry may be considered.

Accordingly, since an amount of the patient information and the photographing information is relatively too much for the manual input of the operator, there may be risk of erroneous inputs.

As the patient identification information, characters or signs to identify a patient may be used. For example, the name of the patient, bar code, or patient ID may be used. In the present invention, as the patient identification information (ID information), ID number consisting of numerals provided to the patient may be preferably used.

Figure 9:
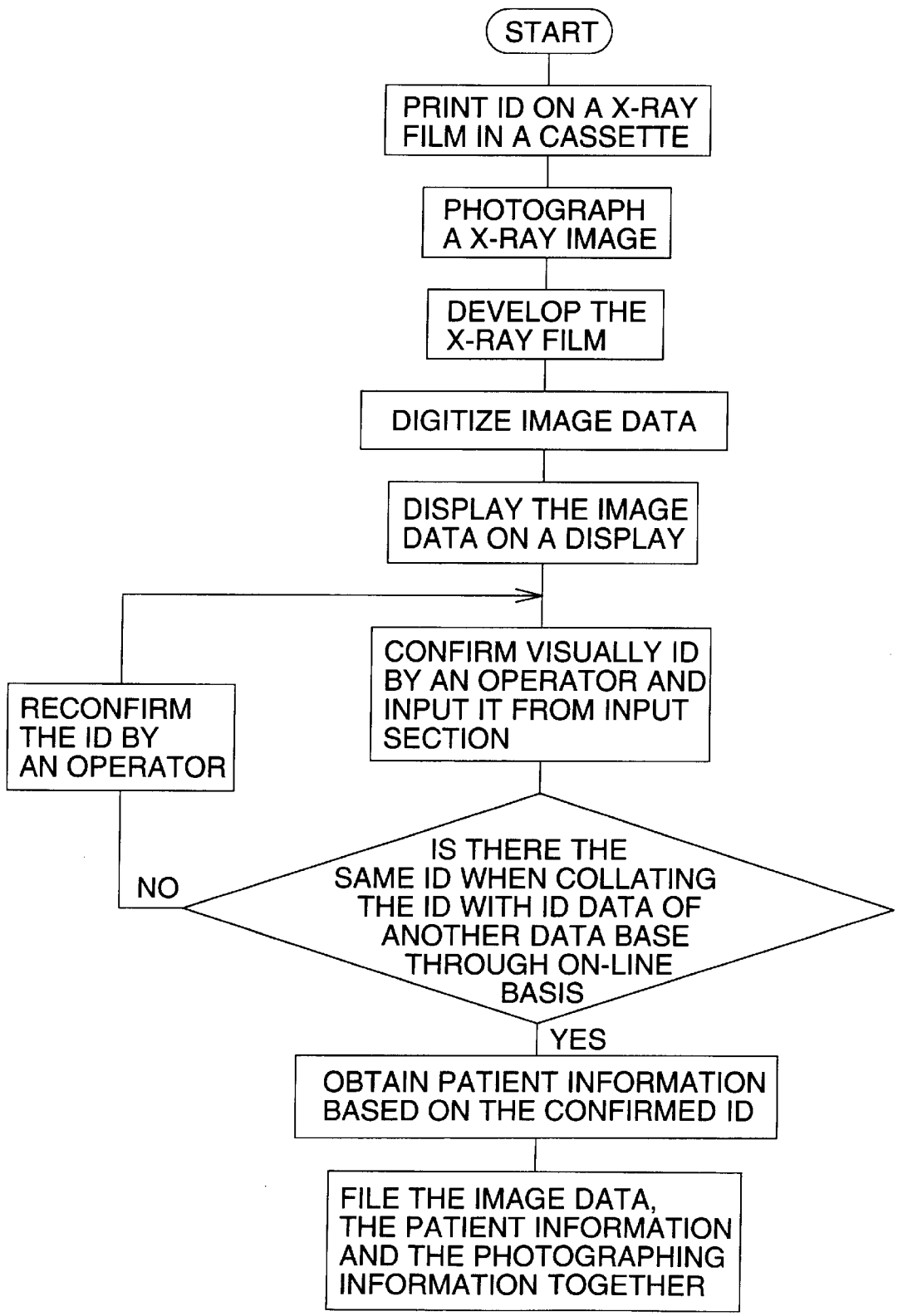
FIG. 9 is a flow chart showing a inventive system for reading X-ray image information.

An embodiment of the present invention is shown in a flow chart in FIG. 9. The similar steps as the conventional method are conducted up to the step that an X-ray image including ID information is digitized by the digitizer and is indicated on the display means. When an operator confirms the ID information visually and inputs the patient ID number by an input means, a reading means searches a external data base through on-line, reads corresponding patient relevant information and indicates it on the display. When the obtained patient relevant information is not wrong, the patient relevant information is stored with the digital image data as the patient synthesis information.

When the patient relevant information read from HIS or RIS is wrong, the ID information is checked and the patient ID number is corrected to the right patient ID number. In the present invention, an amount of the patient relevant information obtained from HIS and/or RIS is limited to a necessary minimum amount. That is, among the patient relevant information registered in HIS and RIS, only the patient relevant information as to the patient expected to be photographed and the photographed patient is transmitted to the image information reading system.

As the structure of RIS, as an example, the following system may be considered.
(1) On the photographing day, information (including ID information) as to the patient to be photographed is registered in RIS. The registration includes the case that the information is transmitted from HIS and the case that an operator inputs manually by a key board.
(2) The registered patient information is distributed for each photographing room, and the name of the patient expected to be photographed is indicated on a terminal display located in the photographing room or in the vicinity of the photographing room.
(3) When the photographing has been completed, the operator operates the terminal display and registers the photographing was completed.

Accordingly, if only the patient relevant information with regard to the registered patient is used as the reference information to be searched by the operator, it is not necessary to search all the patients registered in the hospital (or HIS). As a result, an amount of patient relevant information to be searched can be reduced and working hours can be shortened. Further, with regard to the photographing information, the photographing engineer may input it into RIS upon completion of the photographing or it is automatically inputted into RIS by connecting the photographing apparatus with RIS through an on-line cable such as RS-232.

Another example of Embodiment 2 is explained with reference to a flow chart in FIG. 10. The similar steps as the conventional method are conducted up to the step that an X-ray image including ID information is digitized by the digitizer and is indicated on the display means. In this example, there is provided a recognizing means comprising an ID recognizing apparatus which detects a section of ID information from the read image information, recognizes patient ID number from the ID section and inputs the patient ID number. More concretely, as disclosed in Japanese Patent Application Publication 7-49541, the following structure may be considered. A X-ray image digitizer is directly connected with an automatic processing apparatus and an ID number recognizing means to recognize ID information on a X-ray film with the similar manner of OCR is provided.

Accordingly, it is not necessary for an operator to input the patient ID number. The operator merely operates the digitizer so as to digitize the X-ray film on which the ID information is printed. After that, the ID number is recognized by the ID recognizing means and the recognized ID number is inputted. At this stage, a recognizing rate that OCR recognizes the patient ID number correctly is not 100%. The recognizing results always contain an incomplete recognition or an erroneous recognition. In order to solve the incomplete recognition and the erroneous recognition, in the present invention, the patient relevant information as to the photographed patient registered in another data base (RIS) as mentioned above is utilized. In the present invention, several candidate ID numbers are presumed for the recognized ID number automatically recognized by OCR and the several candidate ID numbers are provided with priority order respectively. If the recognized ID number is not found in the registered patient ID numbers inputted together with other patient information of the photographed patient from the data base of RIS into the image information reading system, it may be judged that the recognized ID number is erroneously recognized by OCR. In this case, by comparing the recognized ID number with the registered patient ID numbers, a registered patient ID number having the highest probability that its patient ID number conform with the recognized patient ID number is used as the printed ID number.

In the case that the automatic recognition is not conducted perfectly due to an obscure character formed by poor printing, the image data are indicated on the display means and the image data are stored with the patient ID number determined from the candidate IDs by the comparison stated above. Further, if the several candidate IDs presumed from the recognized patient ID number are not found in the registered patient IDs, the operator investigates the cause of the situation and provides a proper ID number. With the above manner, when the recognized patient ID number is identified from the registered IDs, the patient information and the photographing information with regard to the patient ID number are read and are stored together with the image data.

Figures 11, 12:
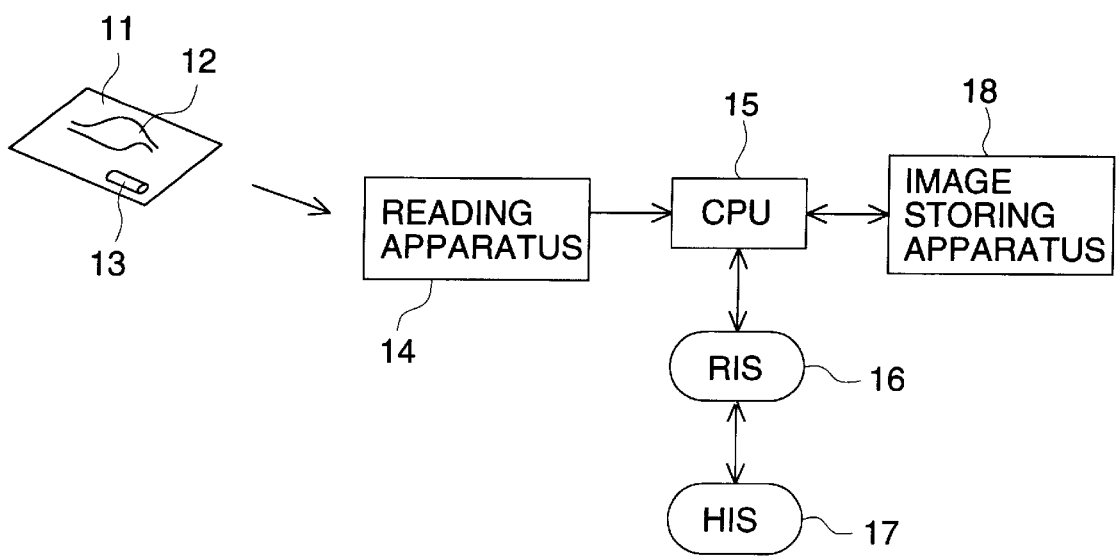
FIG. 11 is a view showing an outlined structure of the inventive system for reading X-ray image information.
FIG. 12 is a view showing an example of ID information.

FIG. 11 shows a view showing an outlined structure of the reading system for a X-ray image information. In FIG. 11, ID information 13 is printed on a X-ray by a name printer film before photographing. In this time, in ID information 13, the photographing date, the name of patient, the distinction of sex, age, patient ID number are recorded. The above information are read from RIS and printed on a rabble. The rabble is set at a predetermined position on a printer (Konica KD-W) and a cassette containing a X-ray film is loaded on the printer, whereby the ID information 13 is printed on a corner of the X-ray film. When a diseased section of the patient is photographed on the X-ray film and the X-ray film is developed, a X-ray image of the diseased section and the ID information 13 are obtained on the X-ray film. By loading the X-ray film on a film digitizer used as a reading apparatus, the X-ray image and the ID information 13 are digitized and digital image data are outputted. In the computer 15 comprising a display means to indicate the read image data as a visual image and an inputting means to input information as to the patient, the outputted digital image data are indicated. An operator visually confirms the patient ID number from the ID information, inputs the patient ID number, searches through on-line network a radiology department information system 16 (RIS) and/or a hospital information system 17 (HIS) used as another data base, in which the patient information including patient ID numbers are registered, other than the data base of the X-ray image information reading system, and obtains necessary information. At this time, when the patient ID number is not found in the above another data base, it may be considered due to an erroneous input by the operator. Accordingly, the operator visually checks again the patient ID number from the patient ID information, inputs the correct patient ID number and searches again.

The thus obtained patient information from the another data base is stored together with X-ray image data in image storing apparatus 18.

Figure 13:
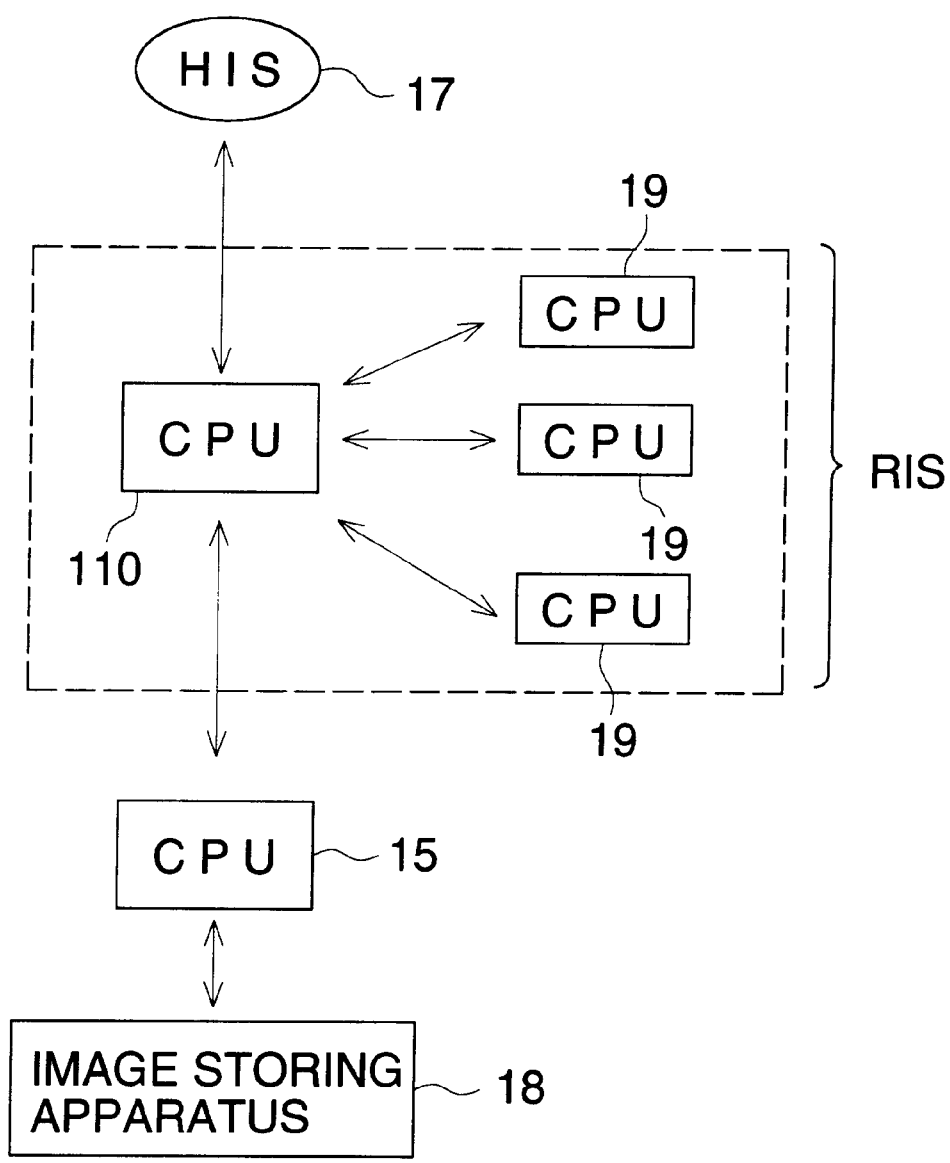
FIG. 13 is a view showing an outlined structure of a radiology department information system (RIS).

Now RIS and HIS connected in a network through on-line are explained with reference to FIG. 13. Generally, when a patient consults a doctor in the hospital, the patient information (name, the date of birth, the distinction of sex, the condition of the patient, disease history, and so on) is registered in the time of the first diagnosis. As to the patient necessary to be subjected to the X-ray photography, during the diagnosis by the doctor in charge, an operator operates a photography reserving system (or an ordering system which is a part of HIS), checks available time and date, and registers at the time on the data the patient ID, the photographing information such as the section to be photographed and the photographing condition. Then, at 0 a.m. on the reserved photographing date, the photography reserving system automatically sends the patient ID number, the name of the patient, the photographing information to the computer 110 of RIS. When the photographing date is the reserving date, the photography reserving system sends the patient ID number, the name of the patient, the photographing information to the computer 110 of RIS simultaneously with the reservation. RIS allots the patients sent on the basis of the photographing information and the information as to the number of patient to be photographed today to a proper photographing room and indicates the patient information on the terminal display 19 located in the vicinity of the photographing room. The ID information of the patient is printed by a printer of the terminal 19.

More concretely, in the time of photographing the patient, the ID information outputted from RIS is printed on a X-ray film on a cassette by the name printer, and the patient is photographed on the X-ray film. The photographed X-ray film is transferred from the cassette to a magazine in a dark room. Then, by setting the magazine at a magazine setting section on an automatic developing machine, the X-ray film is fed one by one to the developing machine.

As another method, for example, it may be considered the case that a diseased section is photographed by a chest section film changer. In this case, ID information can be printed on a X-ray film set in the changer by a label printer. Further, in the case that the photographing apparatus or the changer is connected with the developing machine by a conveying system, it may be considered that such a printing device is provided on the way of the conveying system. In this case, in stead of the printing device, a printing means by the use of light emitting elements such as LED, CRT, LCD or Laser can be provided on the way between the photographing apparatus or the changer and the developing machine, and the ID information can be printed on the X-ray film by the printing means.

In the above manner, the X-ray film conveyed to the developing machine is developed and the image containing the ID information is formed on the X-ray film.

Figure 14:
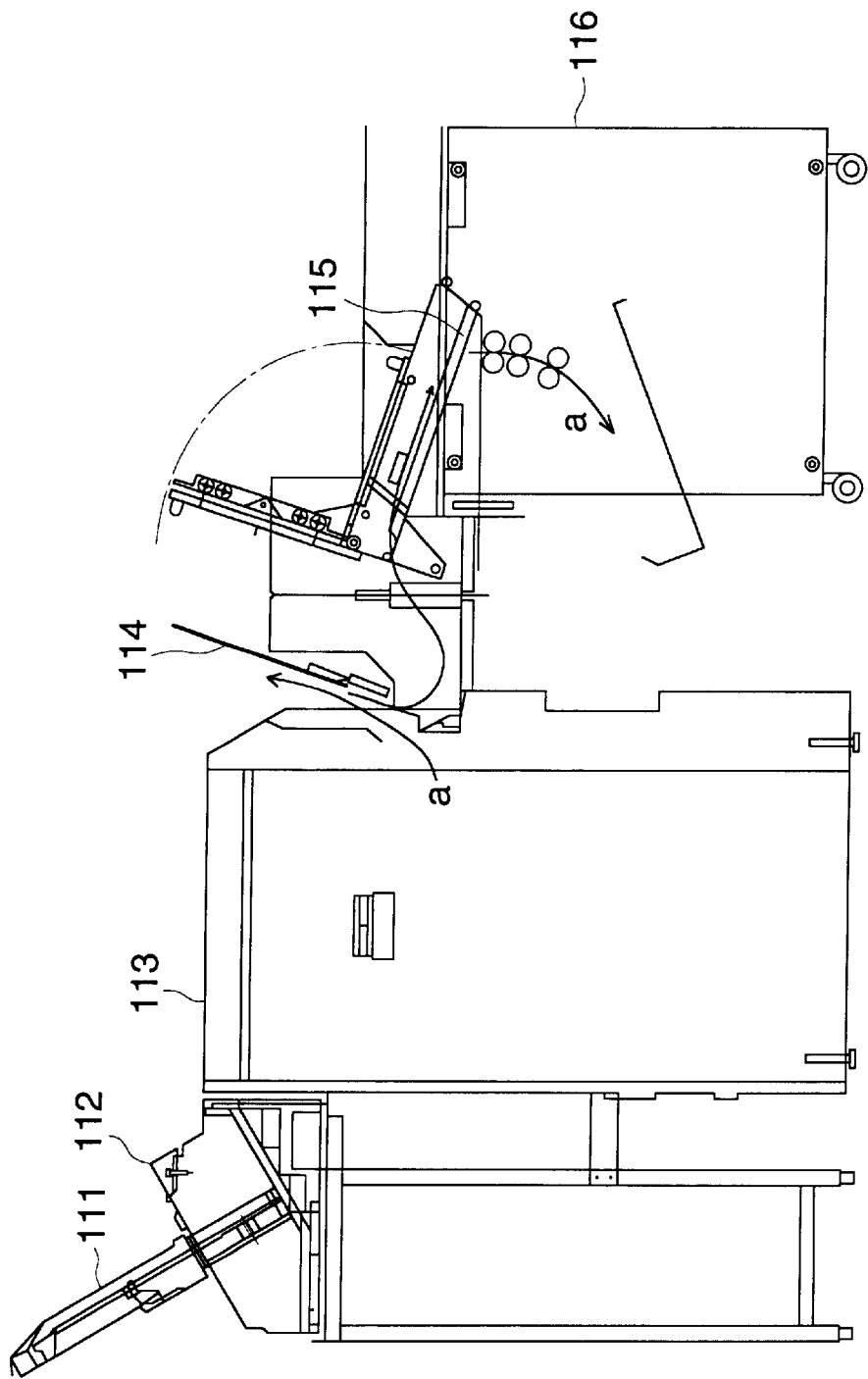
FIG. 14 is a sectional view showing a processing system of the present invention including an automatic developing machine and a digitizer.

In FIG. 14, a photographed X-ray film is accommodated in a film magazine 111 and the film magazine 111 is set on a automatic feeder 112. The X-ray film is fed from the automatic feeder 112 to an automatic developing machine 113 by which the X-ray film is developed. The X-ray film delivered from the developing machine proceeds along the arrowed mark "a" through a film shunt branch passage 114 and a film detecting sensor 115, and the X-ray film is inserted into a digitizer 116 without being handled by the operator's hand. The film shunt branch passage 114 and the film detecting sensor 115 has not only the function to insert the X-ray film delivered from the automatic developing machine 113 into the digitizer 116, but also has the function to detect the trouble when a film conveyance trouble takes place on the digitizer and to shunt next X-ray film delivered from the automatic developing machine 113 into the film shunt branch passage 114. The film conveyance trouble is detected in such a manner that a signal outputted from the film detecting sensor 115 provided in the vicinity of the film reading means of the digitizer is monitored and if a X-ray film is detected to stay over a predetermined time period in the digitizer, it can be judged that the film conveyance trouble may take place. As a result of such a judgment, the film conveying system is controlled such that the next X-ray film is lead to the film shunt branch passage 114 so that the next X-ray film is not inserted into the digitizer. In this embodiment, a mechanical type sensor is used as the film detecting sensor. However, a light reflection or transmission type optical sensor, an electrostatic capacitance sensor, a radiation sensor, or a ultrasonic sensor may be used.

In this embodiment, a laser digitizer is used as the digitizer. However, a digitizer with a CCD or a video camera may be used. In the digitizing, a sampling interval is preferably 50 to 200 $\mu$m. For the size (3 to 5 mm) of character used as the ID information, it may be preferable that the sampling interval is determined so as to digitize the character with pixels of 10 to 50 in longitudinal and transverse directions. The gradation is adjusted to an extent that the density value of 03.5 is read by the digital value of 04095. In order to make the accuracy of the ID recognition higher as far as possible, the gradation characteristics is preferably adjusted such that the ID information is read with the high contrast of character. For this purpose, for example, in the case that the ID section is predetermined at a specific region on a X-ray film and the specific region is located at a position distinguishable from the image of the disease section of a patient, it may be effective to read the ID information under the gradation control that the gradation characteristics for the specific region for the ID section is controlled dynamically so as to make the contrast higher, for example, the density value of 02.0 is read by the digital value of 04095.

The thus digitized X-ray film is discharged from a discharging port and be kept waiting at there until the operator takes away.

The digitized X-ray image data (digital image data) are transmitted through I/F to CPU (a computer 15 in FIG. 11).

Figure 10:
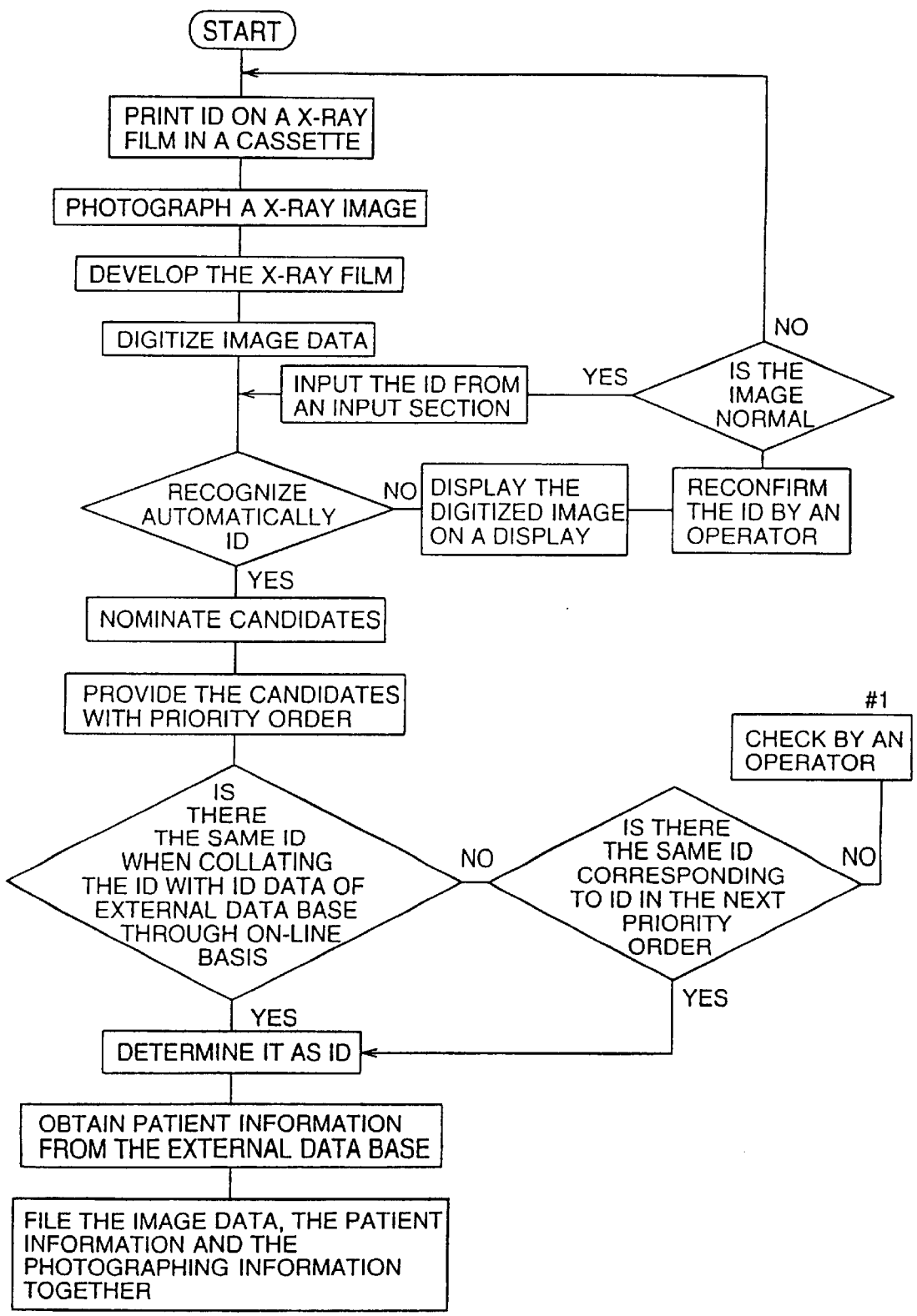
FIG. 10 is a flow chart showing another inventive system for reading X-ray image information.

A flow chart in FIG. 10 indicates a procedure with which the ID information is recognized in the computer 15.

(1) Among the digital image data, the location of the ID section is detected. Dispersion value is calculated for each of plural candidate regions predetermined for the ID section. A candidate region having the highest dispersion value is determined as the ID section.

(2) Among the determined ID section, firstly, a location of patient ID number is specified. The patient ID number is compared with previously registered patterns, whereby numerical data of the ID number are recognized. As the comparing method, there are SDF method, pattern matching method and neutral method. Either method may be used in the embodiment.

Based on the thus recognized patient ID number, plural candidate ID numbers are presumed and arranged sequentially from a candidate whose probability that numerical data of ID number are conformed with that of the recognized patient ID number is the highest.

On the other hand, the ID information of the photographed patient is sent from the terminal display 19 including CPU to a computer 15 of the image information reading system of the present invention at the same time that the completion of the photographing is registered.

Since the recognized patient ID number necessarily exists in several patient ID numbers of the photographed patient, the candidate ID numbers are compared with the several patient ID numbers of the photographed patients sequentially in a order from the candidate ID number having the highest probability. In the case that the recognized patient ID number is not found in the patient ID numbers of the photographed patients, it may be considered that the recognized patient ID number is wrong. Then, the candidate ID number having the highest probability is compared with the patient ID numbers of the photographed patients. In the above manner with which the comparison is repeated, the patient ID number is determined bases on the recognized patient ID number.

In the above procedure, when the following situations take place on ID information on a X-ray film, the ID information is temporarily stored as a recognition failure in another directory in the computer 15 other than the directory in which the X-ray image data whose ID information is identified is stored.

a) The patient ID number could not be specified.

b) The position of the ID section could not be specified.

c) The patient ID could not be recognized.

d) The recognized ID number could not be found in the registered ID number of the photographed patients.

The above recognition failure may be caused by the following events.

1. The entire surface of the film is white or black due to a failure in the photographing.

2. The patient ID number is printed in out of focus due to troubles of the name printer.

3. The sharpness of numerical data in the patient ID is low due to the reason that the sampling interval used for reading the patient ID is too large for the size of the patient ID.

The X-ray image to which the ID recognition is failed is indicated on a display means by the operation of an operator. When the ID information of an X-ray image can be confirmed visually, the operator inputs the visually confirmed ID information by a inputting means. If the ID information of an X-ray image could not be confirmed visually even on the display means, the photographed film will be checked or the X-ray image will be digitized again.

Incidentally, in the case corresponding to the case marked with #1 in FIG. 10 that the candidate ID numbers could not be found in the patient ID number of the photographed patients even though the ID number could be recognized, the operator checks the cause of this case and takes a proper counter action. Since the cause by which this case occurs so often is an erroneous recognition of the patient ID number, this trouble may be solved when the operator visually checks the patient ID number and inputs the correct ID number.

With the patient ID number recognized by the above procedure, the computer 15 requests HIS 17 or RIS 16 to transmit the corresponding patient information. When the patient information is not obtained through on-line, the patient information is inputted manually by an input means such as a key board connected to the computer 15.

Figure 15:
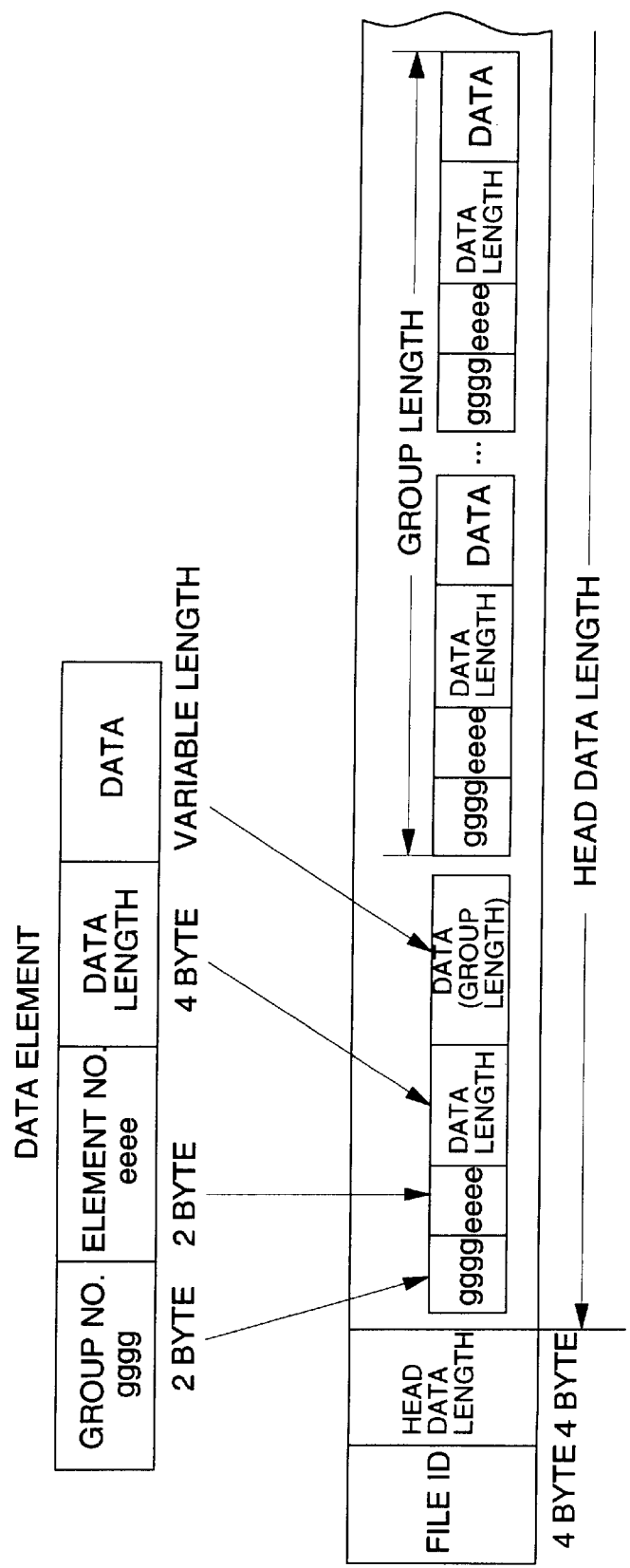
FIG. 15 is a view showing a format of a header of the present invention.

With the manner mentioned above, the patient information and the photographing information are obtained, and the digitized image data are stored with an added information such as the patient information and the photographing information in an image storing apparatus 18 which is a mass storage memorizing medium such as an optical magnetic disk. At this time, as a format of the added information (or a header data) to be stored, the format shown in FIG. 15 may be used. As a group number, for example, 0001 representing verification information and 0010 representing patient information may be used. As an element number, for example, in the case of 0010 (patient information), 0010 representing the name of the patient, and 0020 representing patient ID number may be used. Hereinafter, these data are stored in a data means.

In the time of storing, an amount of data can be compressed with a technique of image compression. In this case, the used compression method is registered as the added information in the header data.

Further, in the time that the patient information, the photographing information and the digitized image data are obtained normally, the operator will distribute the X-ray film discharged from a discharging port of the digitizer to a department requesting a medical image information of the patient. As a result, the department requesting the medical image information of the patient can obtain the medical image information within a very short time after requesting the medical image information of the patient.

Embodiment 3

Next, an embodiment of a system in which the discrimination for the inserted orientation of a X-ray film of a sheet-like recording medium on which a medical image information is recorded, the storage of both the medical image information and the patient ID information of the patient identification information in a correlated form are conducted will be explained.

The following description is applicable to the embodiment to conduct the discrimination for the inserted orientation of the X-ray film as described on Embodiment 1 or to the embodiment to store both the medical image information and the patient identification information in a correlated form as described on Embodiment 2.

As the patient identification information, any information capable of distinguishing a patient from other patients may be used. The patient identification information is not limited to a specific information. For example, the name of a patient or a patient ID number may be listed as the patient identification information. As the patient information, any information concerning the patient may be used. The patient information is not limited to a specific information. The patient identification information is included in the patient information. As the patient information, the name of a patient, the distinction of sex, age, patient identification information such as a patient ID number, patient information and photographing information such as photographing date.

Figure 16:
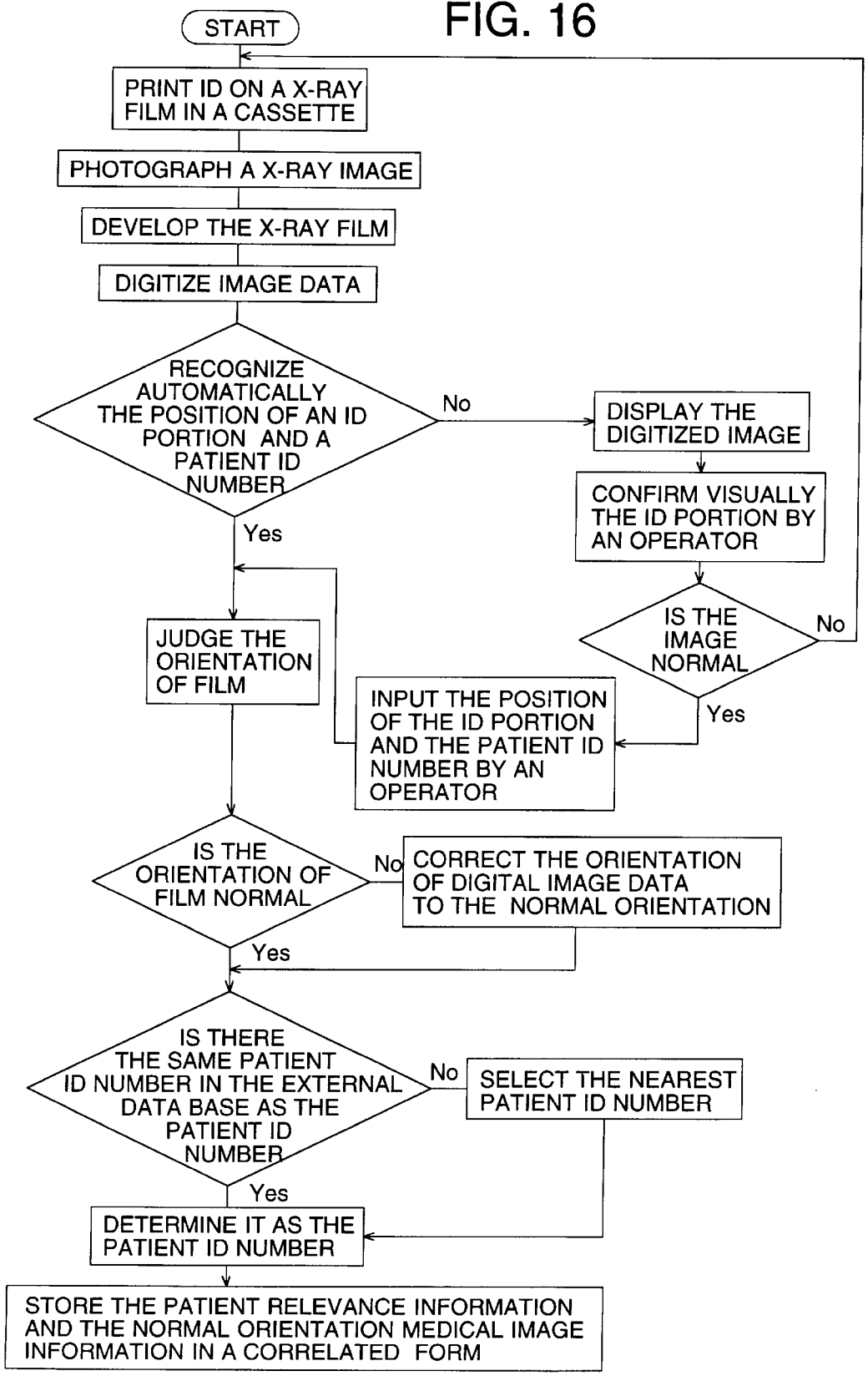
FIG. 16 is a flow chart showing operations of the inventive system for conducting discriminating the inserted orientation of a sheet-shaped recording medium and storing patient relevant information.
Figure 17:
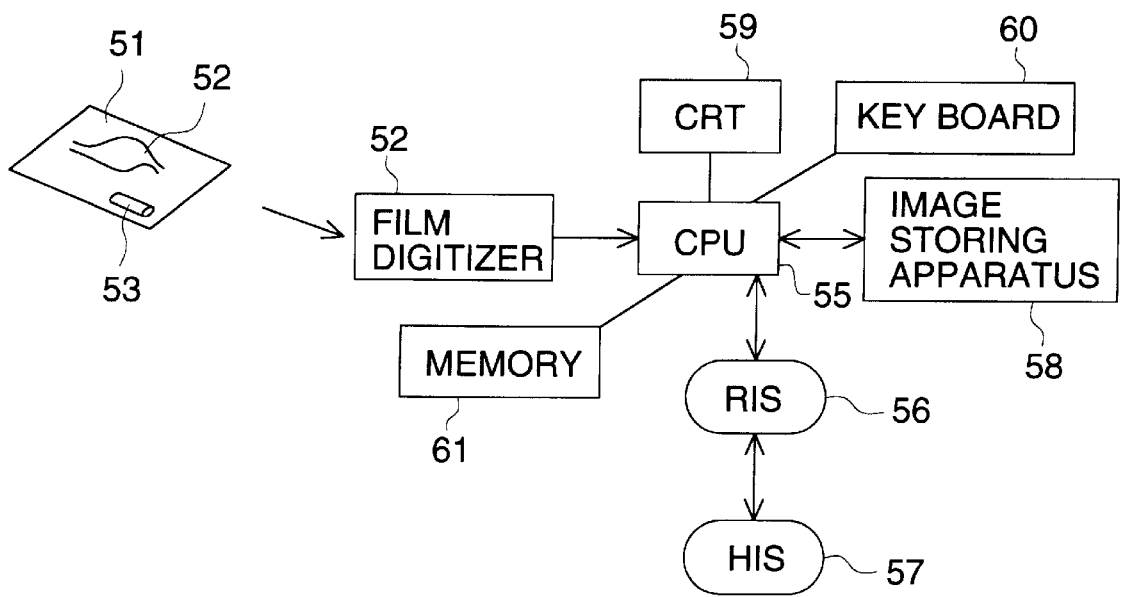
FIG. 17 is a view showing an outlined structure of the inventive system for conducting discriminating the inserted orientation of a sheet-shaped recording medium and storing patient relevant information.

FIG. 17 is a view showing an outlined structure of the inventive system, and FIG. 16 is a flow chart showing operations of the inventive system. ID section 3 which is an image for inserted orientation discrimination in the present embodiment is printed on a predetermined print position on the X-ray film 51 by an apparatus such as a name printer in advance before photographing. By the use of printing type which is made of lead and shaped in a form of ID number, it may be preferable that the ID section 3 is printed simultaneously with the photographing. As the ID section 53, for example, the photographing date, the name of a patient, distinction of sex, age, patient ID number may be written. As the patient identification information, any information capable of specifying a patient may be used. Of course, only the patient ID number may be used.

The information is outputted from RIS and written on a label by a printer in advance. Then, by set the label at a printing machine and by inserting a cassette in which a X-ray film 51 is accommodated in the printing machine, the information is printed on a corner of the X-ray film 51.

Incidentally, if a recording position of an image on the X-ray film is predetermined, such an image may be used as an image for inserted orientation discrimination without limiting the image for inserted orientation discrimination to ID section of the patient identification information. For example, it may be permissible that a mark which is used only for inserted orientation discrimination is printed in advance at a predetermined position. It may be preferable that the image for inserted orientation discrimination is printed on a corner of the X-ray film or more preferably in the vicinity of the corner so that the position of the image for inserted orientation discrimination is changed if the actual inserted orientation of X-ray film is changed.

Figure 4:
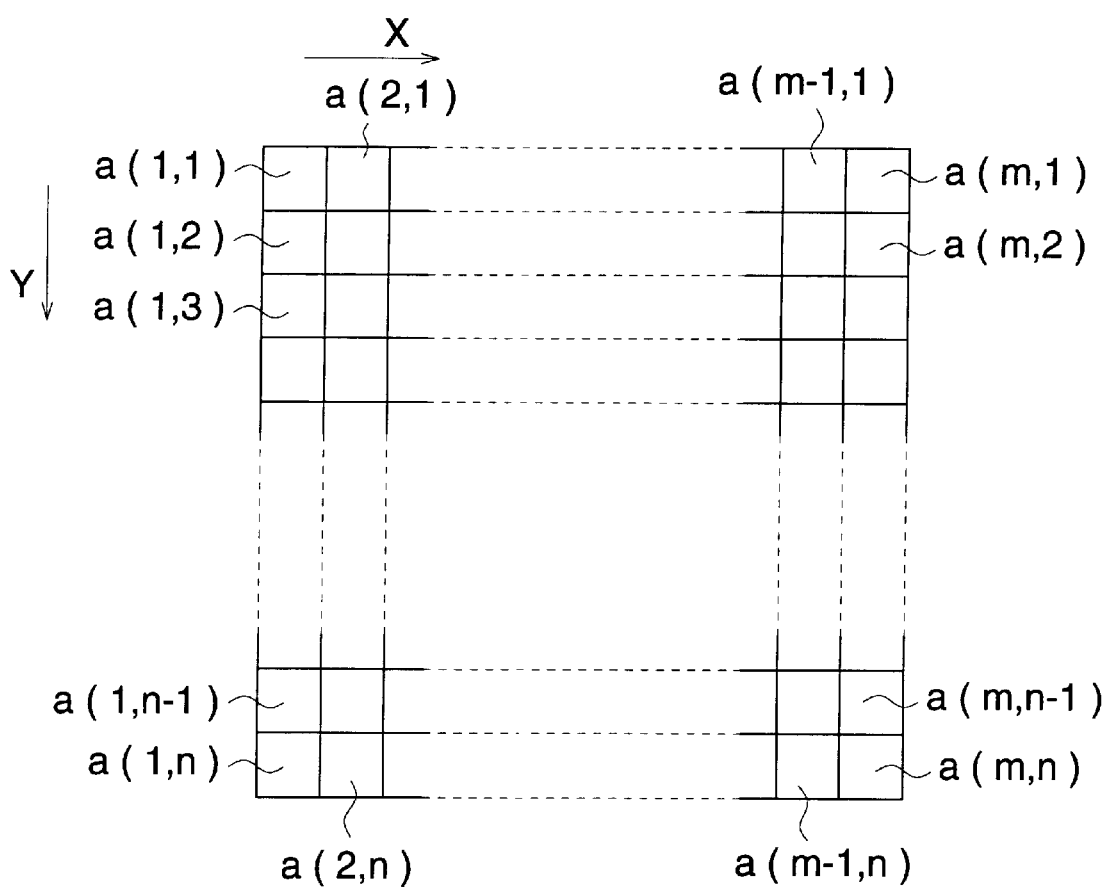
FIG. 4 is a view to explain an image signal of each pixel obtained by reading image data according to the present invention.
Figure 5A:
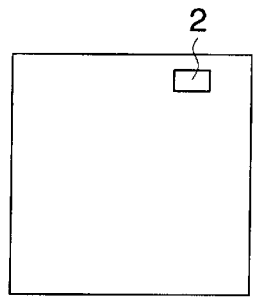
FIGS. 5(a) to 5(h) are views to explain a positional relationship of image data recorded in square sheet-shaped recording mediums.
Figure 5E:
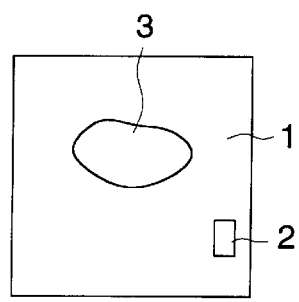
Figure 5B:
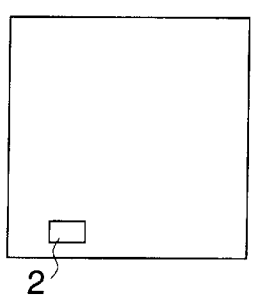
Figure 5F:
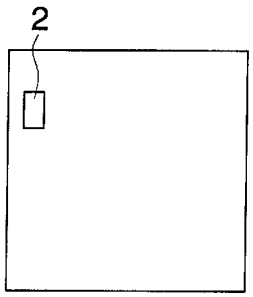
Figure 5C:
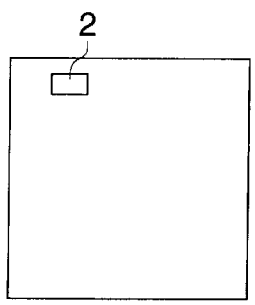
Figure 5G:
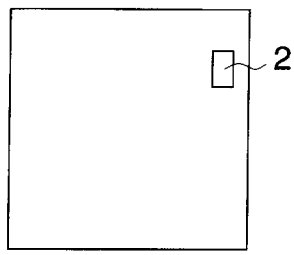
Figure 5D:
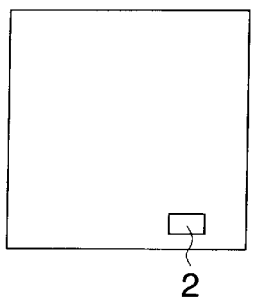
Figure 5H:
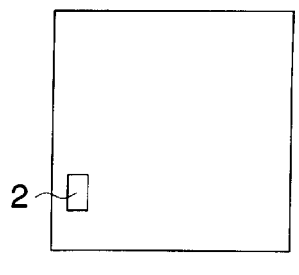

After ID section 53 is printed, a X-ray image of the diseased section of the patient is photographed on a X-ray film. By developing the X-ray film, X-ray image 52 as a medical image information and ID section 53 as the patient identification information can be obtained. The image information comprising the X-ray image 52 as the medical image information and ID section 53 as the patient identification information on the X-ray film 51 is conveyed to a reading apparatus acting as both a reading means and a converting means. The X-ray film conveyed to the reading apparatus is scanned from a(1,1) to a(m,n) as shown in FIG. 4, and an image of each pixel on the X-ray film is converted into digital image data. As the reading apparatus acting as the reading means and the converting means, in the present embodiment, a film digitizer 54 is used. Of course, it may be permissible if the reading means and the converting means are separated from each other.

The digital image data converted by the film digitizer 54 are transmitted to CPU 55 in the computer, a position of the ID section on which the ID information 53 used as the image for inserted orientation discrimination are recorded and a patient ID number are automatically recognized and are inputted. In this embodiment, CPU 55 is used as both the recognizing means for recognizing the position of the image for inserted orientation discrimination and the inputting means. The detailed explanation of a method of recognizing the ID section by the use of dispersion values or standard deviations in candidate regions is the same as that described in Embodiment 1. Further, the detailed explanation of a method of recognizing the patient ID number by the use of SDF method, pattern matching method or a neutral net is the same as that described in Embodiment 2.

In the case that ID section is not recognized automatically, the digital image data are indicated once on CRT 59 used as display means and an operator visually confirms the ID section. Then, the operator inputs the position information and the patient ID number manually by a key board 60 used as input means. If ID information could not be read from the image indicated on the CRT 59, the image could not be observed or the image was of abnormal, the X-ray image and the ID information are read again by the digitizer.

When the position and the ID number of the ID section are recognized automatically, or when the position and the ID number of the ID section are inputted by the operator, the position of the image information for orientation discrimination and the patient identification number are recognized.

In memory 61, the position of an image for inserted orientation discrimination or the position of ID section and the inserted orientation of X-ray film of a sheet-like recording medium are stored in a correlated form in advance. When the recognized position of the image for inserted orientation discrimination is inputted, the inserted orientation of X-ray film corresponding to the recognized position of the image for inserted orientation discrimination is read out from the memory 61. With regard to the relationship among the type of X-ray film, the inserted orientation and the position of the ID section, the detail explanation is made in Example 1.

After the inserted orientation of the X-ray film read by the digitizer 54 is discriminated, the digital image data is rearranged by correcting means so as to become digital image data having a normal inserted orientation as explained in detail in Embodiment 1. For example, the digital image data read by the film digitizer 54 are stored once in the memory 55, thereafter, the digital image data stored in the memory 55 are rearranged by CPU 55 used as the correcting means so as to become digital image data having a normal inserted orientation. After the rearrangement, the digital image data having a normal inserted orientation are stored again in the memory 55. In this case, the CPU 55 is commonly used as the means for recognizing the position of the image for inserted orientation discrimination on the digital image data, as the means for discriminating the inserted orientation of the X-ray film read by the reading means, and as the correcting means for rearranging the digital image data so as to become digital image data having a normal inserted orientation. Of course, these means may be acted by different apparatuses or CPUs.

The patient relevant information of the photographed patient comprising patient information, photographing information, and patient ID number is transmitted from a terminal display of RIS 56 to CPU at the same time that the completion of photographing is registered. The patient ID number which is recognized by the recognizing means or inputted by the input means necessarily resides ID numbers of several photographed patients. Then the patient ID number which is recognized by the recognizing means or inputted by the input means is compared and collated with the registered patient ID numbers transmitted from RIS being an external data base. As a result of the comparison and the collation, if the patient ID number which is recognized by the recognizing means or inputted by the input means conforms with one of the registered patient ID numbers transmitted from RIS being an external data base, the digital image data of the patient ID number are rearranged by the correcting means and are stored as the digital image data having a normal inserted orientation in the memory. On the other hand, the patient information and the photographing information corresponding to the patient ID number are read from the information transmitted from RIS. Then, the digital image data having a normal inserted orientation are read from the memory as medical image information of the patient ID number and stored together with the patient information and the photographing information in a correlated form in an image storing apparatus 58 such as an optical magnetic disk or a hard disk uses as a storing means. The detailed explanation as to the storing is the same as stated in Embodiment 2. Incidentally, the patient identification information recognized by the recognizing means as patient identification information such as the patient ID number may be stored together with the medical image information in a correlated form.

In the case that the patient ID number which is recognized by the recognizing means or inputted by the input means is not found in the-registered patient ID numbers transmitted from RIS being an external data base, the nearest similar ID number to the printed patient ID number are selected by a selecting means such as CPU from the registered patient ID numbers. Supposing as one example that printed patient ID number is recognized as (4126) by the recognizing means and the registered patient ID numbers of several photographed patients registered in the data base of RIS includes (4124), (4125), (4134) and (4136), the first candidate is (4124), the second candidate is (4125), the third candidate is (4136) and the fourth candidate (4134).

Further, the probability that numeral 2 is erroneously read as 3 or (4126) is read as (4136), the probability that numeral 6 is erroneously read as 4 or (4126) is read as (4124), and the probability that numeral 6 is erroneously read as 5 or (4126) is read as (4125) are stored in the memory, and then when the priority order is determined for each candidate, the stored probability is considered. For example, when the probability that numeral 2 is erroneously read as 3 is the highest, the first candidate is determined as (4136).

After the similar patient ID number is selected, the medical image information read from the memory 61 may be automatically stored in a correlated form together with the patient information transmitted from RIS. However, in order to avoid an error, it may preferable that the medical image information read from the memory 61 and the patient information transmitted from RIS are once indicated on the CRT, and after an operator confirms them on the CRT, they are stored in the memory.

Of course, needless to say, the data communication can be conducted not only with RIS 56, but also with HIS 57.

In stead of providing the registered patient ID numbers transmitted from RIS 56 with priority order, ID number candidate having similar ID numbers are presumed based on the recognized ID number and the ID number candidates are arranged in priority order that the probability that numerals of ID number conform with numerals of the recognized patient ID number is higher. The ID number candidates are compared with the registered ID number transmitted from RIS 56 sequentially in priority order. For example, when the recognized ID number obtained by reading a X-ray film is (4126), the following may be presumed by a computer. Numeral 4 may be correct. Numeral 1 may be correct, however there is a possibility that printed numeral 7 is read erroneously as numeral 1. Numeral 2 may be correct. Numeral 6 may be correct, however there is a possibility that printed numeral 0 is read erroneously as numeral 6. On the basis of this presumption, the priority order is determined such that the first candidate is (4126), the second candidates are (4726) and (4120), and the third candidate is (4720). Incidentally, in this case, the probability that each numeral is read erroneously as other one may be stored in advance. After the priority order is determined, the ID candidates are compared with the registered ID number transmitted from RIS sequentially in the priority order.

In the case that above examples are conducted, the separate apparatuses mentioned above may combined as a system. However, it may be possible that all of the means in the above separate apparatuses are integrally incorporated in a single apparatus as one body. In addition, into the above system or the single apparatus, it may be possible that another apparatuses having various functions may be incorporated.

The description in Examples 1 and 2 may be applicable to Example 3.

In Examples 1 and 3, when the orientation of the X-ray film is discriminated as the normal orientation by the orientation discriminating means in the reading means, the digital image data may be stored as they are without rearranging.

What is claimed is:

1. A method of reading a medical image on an approximately rectangular X-ray film sheet, comprising the steps of:
    writing an identification code of an object with light in the shape of a non-square approximate rectangle and centered at a predetermined position near a comer on the film sheet other than on a line connecting the centers of two opposite sides of the film sheet;
    radiographing the object on the film sheet;
    developing the film sheet so as to visualize a medical image of the object and the identification code;
    reading the visualized medical image and the visualized identification code on the film sheet mounted on a reading device and converting them into digital data;
    recognizing the position of the digital data of the identification code on an arrangement of digital data corresponding to the film sheet; and
    discriminating the orientation of the film sheet mounted on the reading device and further discriminating whether the film sheet is read by the reading device from its obverse side or from its reverse side on the basis of the recognized position of the digital data of the identification code on the arrangement of digital data.

2. The method of claim 1 wherein positions of the identification code on the arrangement of digital image data and mounted orientation of the film sheet are memorized in a correlated form in a memory, whereby, in the discriminating step, when the memory is addressed with the recognized position of the identification code, the correlated mounted orientation of the film sheet is read from the memory so that the mounted orientation of the film sheet read by the reading device is discriminated.

3. The method of claim 1, further comprising:
    rearranging the digital image data on the basis of the discriminated mounted orientation so that the arrangement of the digital image data read on the discriminated mounted orientation is rearranged into a normal arrangement read on a desired mounted orientation, and
    storing the image data rearranged in the normal arrangement.

4. The method of claim 1, wherein a candidate region for the position of the identification code is predetermined on the arrangement of digital image data and the position of the identification code is recognized on the basis of a dispersion value or a standard deviation obtained from data in the candidate region.

5. The method of claim 4, wherein plural candidate regions for the position of the identification code are predetermined on the arrangement of digital image data, the dispersion value or standard deviation is obtained for each candidate region, and the position of identification code is recognized as locating in a candidate region having a maximum dispersion value or the maximum standard deviation.

6. An apparatus for reading a medical image on an approximately rectangular X-ray film sheet, comprising the steps of:
    a printer to write an identification code of an object with light in the shape of a non-square approximate rectangle and centered at a predetermined position near a comer on the film sheet other than on a line connecting the centers of two opposite sides of the film sheet;
    a radiographing device to radiograph the object on the film sheet;
    a developing device to develop the film sheet so as to visualize a medical image of the object and the identification code;
    a reader to read the visualized medical image and the visualized identification code on the film sheet mounted on a reading device and converting them into digital data;
    recognizing means for recognizing the position of the digital data of the identification code on an arrangement of digital data corresponding to the film sheet; and
    discriminating means for discriminating the orientation of the film sheet mounted on the reading device and further discriminating whether the film sheet is read by the reading device from its obverse side or from its reverse side on the basis of the recognized position of the digital data of the identification code on the arrangement of digital data.

7. A method of storing a patient identification code and medical image recorded on a X-ray film sheet in a correlated form, comprising the steps of:

inputting and storing the patient identification code of a patient in a data base; writing the patient identification code of the patient with light on the film sheet;

radiographing an object of the patient on the film sheet;

developing the film sheet so as to visualize a medical image of the object and the identification code;

reading the visualized medical image and the visualized identification code on the film sheet and converting them into digital data;

recognizing the patient identification code from the digital data by an optical character reader;

comparing the recognized patient identification code by the optical character reader with the stored patient identification code in the data base; and storing the digital data of both of the patient identification code and the medical image in a correlated form in a memory when, as a result of the comparing step, the same patient identification code of the recognized patient identification code resides in the stored patient identification code in the data base.

8. The apparatus of claim 6, wherein the discriminating means comprises a memory in which positions of the identification code on the arrangement of digital image data and mounted orientations of the film sheet are memorized in a correlated form, whereby the discriminating means addresses the memory with recognized position of the identification code and reads the correlated mounted orientation of the film sheet from the memory so that the discriminating means discriminates the mounted orientation of the film sheet.

9. The method of claim 6, further comprising:

a correcting means for rearranging the digital image data on the basis of the discriminated mounted orientation so that the arrangement of the digital image data read on the discriminated mounted orientation is rearranged into a normal arrangement read on a desired mounted orientation, and a storing means for storing the image data rearranged in the normal arrangement.

10. The apparatus of claim 6, wherein a candidate region for the position of the identification code is predetermined on the arrangement of digital image data and the recognizing means obtains a dispersion value or a standard deviation from data in the candidate region and recognizes the identification code based on the dispersion value or the standard deviation.

11. The apparatus of claim 10, wherein plural candidate regions for the position of the identification code are predetermined on the arrangement of digital image data, the recognizing means obtains the dispersion value or standard deviation for each candidate region, and recognizes the identification code as locating in a candidate region having the maximum dispersion value or the maximum standard deviation.

12. The method of claim 7, wherein patient relevant information including the patient identification code is stored in the data base, and when, as a result of the comparing step, the same patient identification code of the recognized Patient Identification Code resides in the data base, the patient relevant information obtained from the database and the medical image information read from the film sheet are stored in a correlated form by the storing means.

13. The method of claim 7, further comprising the steps of:

selecting patient identification code closest to the recognized Patient Identification Code when, as a result of the comparing step, the same patient identification code of the recognized Patient Identification Code does not reside in the data base, wherein the selected patient identification code is stored with the medical image information read from the film sheet in a correlated form.

14. The method of claim 12, wherein the patient relevant information comprises patient information or photographing information.

15. The method of claim 12, wherein the data base is a data base of a radiology department information system or a hospital information system.

16. A system for storing a patient identification code and a medical image recorded on a X-ray film sheet in a correlated form, comprising;

a printer to write the patient identification code of a patient with light on the film sheet; a radiographing device to radiograph an object of the patient on the film sheet;

a device to input and to store the patient identification code of the patient in a data base;

a developing device to develop the film sheet so as to visualize a medical image of the object and the identification code;

a reading device to read the medical image and the identification code on the film sheet and converting them into digital data;

recognizing means for recognizing the patient identification code from the digital data by an optical character reader;

comparing means for comparing the recognized patient identification code by the optical character reader with the stored patient identification code in the data base; and storing means for storing the digital data of both of the patient identification code and the medical image in a correlated form in a memory when, as a result of the comparing step, the same patient identification code of the recognized patient identification code resides in the stored patient identification code in the data base.

17. The system of claim 16, wherein patient relevant information including the patient identification code is stored in the data base, and when, as a result of the comparing step, the same patient identification code of the recognized Patient Identification Code resides in the data base, the patient relevant information obtained from the data base and the medical image information read from the film sheet are stored in a correlated form by the storing means.

18. The system of claim 16, further comprising:

a selecting means for selected patient identification code closest to the recognized Patient Identification Code when, as a result of the comparing step, the same patient identification code of the recognized Patient Identification Code does not reside in the data base, wherein the storing means stores the selected patient identification code with the medical image information read from the film sheet in a correlated form.

19. The system of claim 17, wherein the patient relevant information comprises patient information or photographing information.

20. The system of claim 16, wherein the data base is a data base of a radiology department information system or a hospital information system.

21. The method of claim 1, in which the film sheet is approximately square and the code is further located at a predetermined position between the line connecting the centers of two opposites side and a diagonal of the film sheet.

22. The apparatus of claim 6, in which the film sheet is approximately square and the code is further located at a predetermined position between the line connecting the centers of two opposite sides and a diagonal of the film sheet.

* * * * *